United States Patent [19]

Logan et al.

[11] Patent Number: 5,371,551
[45] Date of Patent: Dec. 6, 1994

[54] TIME DELAYED DIGITAL VIDEO SYSTEM USING CONCURRENT RECORDING AND PLAYBACK

[76] Inventors: James Logan, 81 Castle Hill Rd., Windham, N.H. 03087; Daniel Goessling, 43 Davelin Rd., Wayland, Mass. 01778

[21] Appl. No.: 968,439

[22] Filed: Oct. 29, 1992

[51] Int. Cl.$^5$ .............................................. H04N 5/14
[52] U.S. Cl. .................................. 348/571; 348/714; 358/335; 360/10.1; 369/60
[58] Field of Search ................ 360/10.1, 33.1; 369/60; 358/188, 903, 908, 194.1, 160, 183, 335, 133, 22; 348/1, 5, 7, 10, 559, 560, 725, 571, 722, 714

[56] References Cited

U.S. PATENT DOCUMENTS

| | | | |
|---|---|---|---|
| 4,862,269 | 8/1989 | Sonada et al. | 358/160 |
| 4,949,187 | 8/1990 | Cohen | 360/33.1 |
| 4,963,995 | 10/1990 | Lang | 358/133 |
| 4,965,662 | 10/1990 | Shiota | 358/160 |
| 5,099,319 | 3/1992 | Esch et al. | 348/722 |
| 5,103,467 | 4/1992 | Bedlek et al. | 369/60 |
| 5,130,792 | 7/1992 | Tindell et al. | 348/7 |
| 5,132,992 | 7/1992 | Yurt et al. | 348/5 |
| 5,181,114 | 1/1993 | Richards et al. | 358/160 |
| 5,191,431 | 3/1993 | Hasegawa et al. | 358/335 |
| 5,283,639 | 1/1994 | Esch et al. | 348/722 |

Primary Examiner—Mark R. Powell
Assistant Examiner—John W. Miller
Attorney, Agent, or Firm—Allegretti & Witcoff, Ltd.

[57] ABSTRACT

A broadcast recording and playback device employing a "circular buffer" which constantly records one or more incoming audio or video program signals and a microprocessor for accessing the memory to read a playback signal from the circular buffer to display programming material delayed from its receipt by a selectable delay interval. The circular buffer is implemented by a digital memory. Subsystem comprising the combination of a semiconductor RAM memory and a disk memory operated under the control of a microprocessor such that incoming signals are constantly recorded as received while, at the same time, delayed signals are being read from the memory subsystem at a different memory location selected by a microprocessor to provide a user-selected time delay. A plurality of input signal processors provides one or more programming signals to the memory subsystem in compressed digital form and a separate output signal processor converts the compressed digital information read from the memory into a form suitable for display. The audio/video buffer system operates under the control of a microprocessor which accepts commands from a remote command device or a connected host computer.

8 Claims, 2 Drawing Sheets

TIME DELAYED DIGITAL VIDEO SYSTEM USING CONCURRENT RECORDING AND PLAYBACK

FIELD OF THE INVENTION

This invention relates generally to video and audio broadcast recording and playback systems and more particularly, although in its broader aspects not exclusively, to an arrangement for monitoring programming as it is broadcast and for enabling the listener or viewer to pause, replay and fast-forward the broadcast programming.

BACKGROUND OF THE INVENTION

The video cassette recorder (VCR) has created desirable viewing options which are not available to the viewer of live television. When viewing pre-recorded programs, the viewer may pause the playback to answer the phone or to view a scene in "stop-action" mode, advance or rewind the recorded material to start the viewing to replay a scene or skip over annoying advertising. Digital recording techniques, such as those described in U.S. Pat. No. 4,963,995, may be used to store the recorded programming in a random access memory comprising the combination of a semiconductor RAM buffer and a disk memory, permitting a desired programming segment to be immediately accessed and viewed without the time consuming fast-forward and fast-reverse tape motion required in conventional video cassette recorders.

SUMMARY OF THE INVENTION

It is an object of the present invention to provide these and other options and capabilities when the user of the broadcast receiver is monitoring the programming concurrently with its reception. For instance, portions of a broadcast program can be reviewed for an "instant replay" (a benefit of the video cassette player's rewind feature), commercials can be "zapped" (a benefit of the video cassette player's fast forward feature), and the program can be "paused" temporarily (a benefit of the video cassettes' pause or stop features).

In accordance with a principle feature of the invention, one or more incoming audio or video signals are continuously digitized, compressed and stored in a buffer memory whenever the invention is in operation whereby, without attention from the user, the invention maintains a "circular buffer" which stores programming received during a preceding time interval of predetermined duration. To implement the continuously operating circular buffer, the invention preferably employs a dual-ported memory system operating under microprocessor control. A data compression unit is connected to supply compressed digital signals to the writing port of the memory system, and a separate data decompression unit is connected to receive data from the reading port of the memory system.

The invention advantageously comprises a microcontroller for selecting the buffer memory location from which the recorded programming is read for playback, the microcontroller being in turn controlled. By a viewer manipulated remote control unit which permits the user to select the portion of the buffered program to be viewed, or alternatively controlled by commands received from a connected computer with the microcontroller and buffer memory acting as a peripheral device.

The invention advantageously includes means for displaying, at the viewer's request, a mosaic of reduced-size images representing images stored in the buffer at spaced time intervals, thereby allowing the viewer to readily locate and select a scene of interest to be replayed. In response to the viewers selection, the memory location from which the images are read is altered to display the selected scene.

In a preferred arrangement contemplated by the invention, programming being received from one or more sources is simultaneously processed by a group of input signal processors, each of which delivers a compressed digital signal to the writing port of the memory system under microprocessor control.

According to a further feature of the invention, the rate of transmission of frames of a video broadcast from the buffer to the video display can be increased or decreased by the user to provide stop action or slow-motion effects.

According to still another feature of the invention, the amount of compression applied to the signal being stored can be varied by the user to allow longer programs to be recorded (with reduced quality) within the available memory space.

According to a further feature of the invention, the sequence of the frames transmitted from the buffer to the video display can be transmitted in reverse order.

According to a further feature of the invention, the viewer may skip unwanted segments of the viewed broadcast by altering the location from which the displayed images are read in order to bypass the display of unwanted material.

As contemplated by the invention, the broadcast buffer memory advantageously takes the form of the combination of a random access memory and a magnetic disk memory, the random access memory providing temporary storage of programming which is in the process of being written to and read from the larger capacity disk memory. To minimize memory space requirements, incoming analog broadcast signals are advantageously digitized and compressed prior to storage in the buffer, then decompressed and converted back into analog form for playback.

In addition, the buffer memory system contemplated by the invention preferably incorporates a programmable clock/calendar device which provides control signals for automatically activating the buffer memory to begin recording at a predetermined time in anticipation of scheduled use.

The invention is equally useful, and indeed simplified when used with high definition television signals which are already digitized and compressed, since those signals may be recorded and played back from the digital video buffer memory without additional processing.

These and other objects, features and advantages of the invention may be more clearly understood by considering the following detailed description. In the course of this description, reference will frequently be made to the attached drawings, in which:

DETAILED DESCRIPTION

Figure 1:
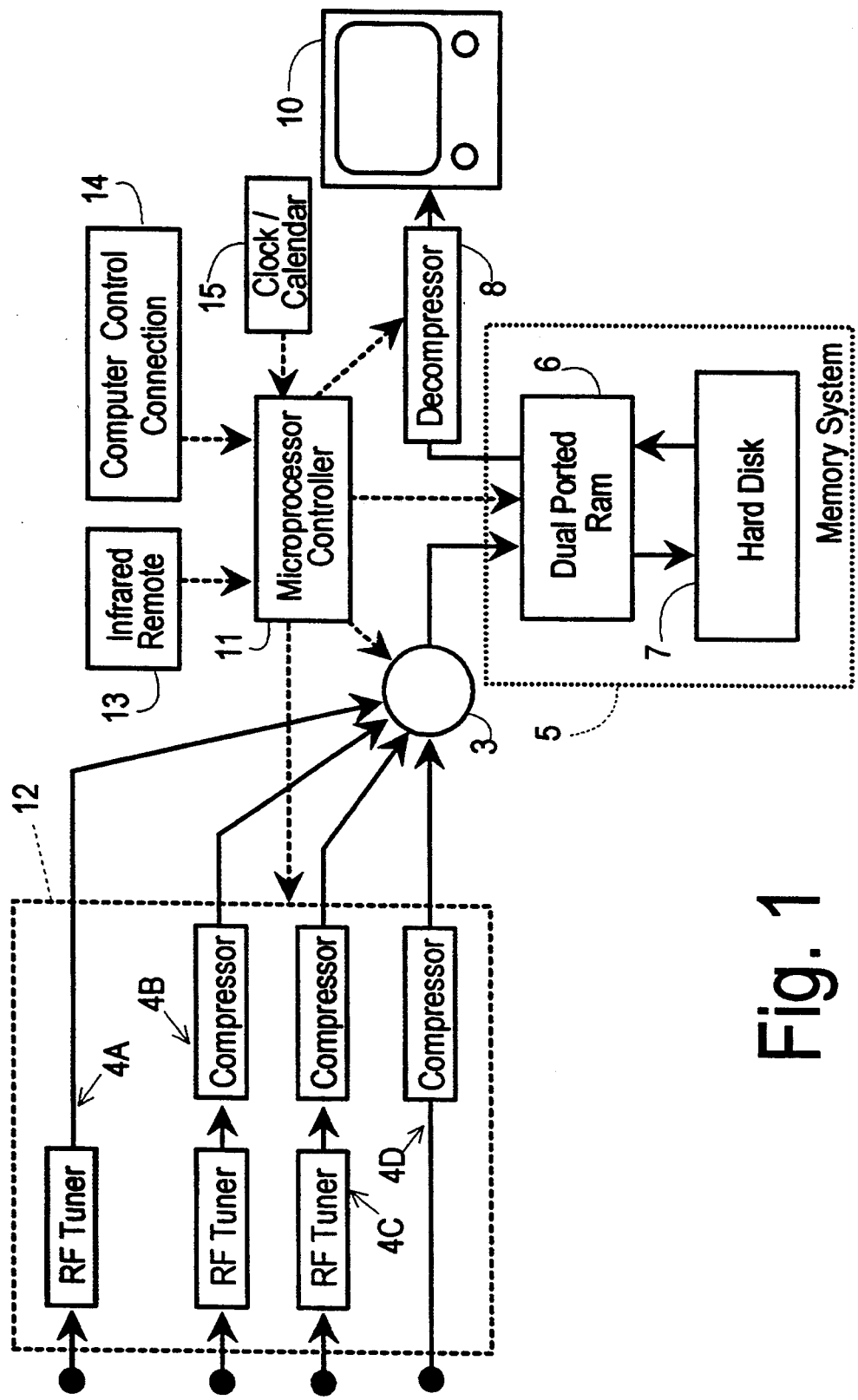
FIG. 1 is a signal flow diagram of a video buffer system which embodies the invention.

FIG. 1 of the drawings shows the principal signal flow paths of a preferred embodiment of the invention. In FIG. 1, video signals are transmitted along the pathways indicated by the solid arrows and control signals are sent over paths indicated by the dotted line arrows.

As seen in FIG. 1, one or more incoming video signals are combined at a switching node 3 after being processed by one or more input signal processing units shown generally within the dotted rectangle 12. The node 3 applies selected ones of the compressed digital signals from the input unit 5 to the input (writing) port of a dual-port memory subsystem 5 comprising a RAM buffer memory 6 and a hard disk magnetic memory 7. The memory subsystem 5 continually stores the incoming data, writing over the oldest data stored on the hard disk 7, so that a fixed duration or "time window" of prior recorded signals are recorded in the memory subsystem 5 at all times. The recorded information is also continuously read from the memory subsystem 5 and supplied to via a decompressor 8 to a video display unit 10.

The memory system 5 operates under the control of a microprocessor controller 11 which also controls the operation of the switching node 3, the input unit 4, and the decompressor 8. The microprocessor 11 is programmed to respond to commands received from an infrared remote control unit 13 manipulated by the user, or alternatively from a computer control connection 14 which provides direct link to the serial or parallel port of a connected computer (not shown).

The invention may be operated under direct control of a host computer. The control connection 14 may take the form of a direct connection to the internal bus of connected host, with the microprocessor 11, the input unit 4, the switching node 3, the dual-ported RAM 6, and the decompressor 8 being mounted on an expansion circuit card which plugs directly into and is powered by the internal bus of the computer. In this arrangement, the hard disk memory 7 may be mounted in one or more of the available expansion bays and connected by disk controller circuitry also mounted on the expansion card.

Figure 2:
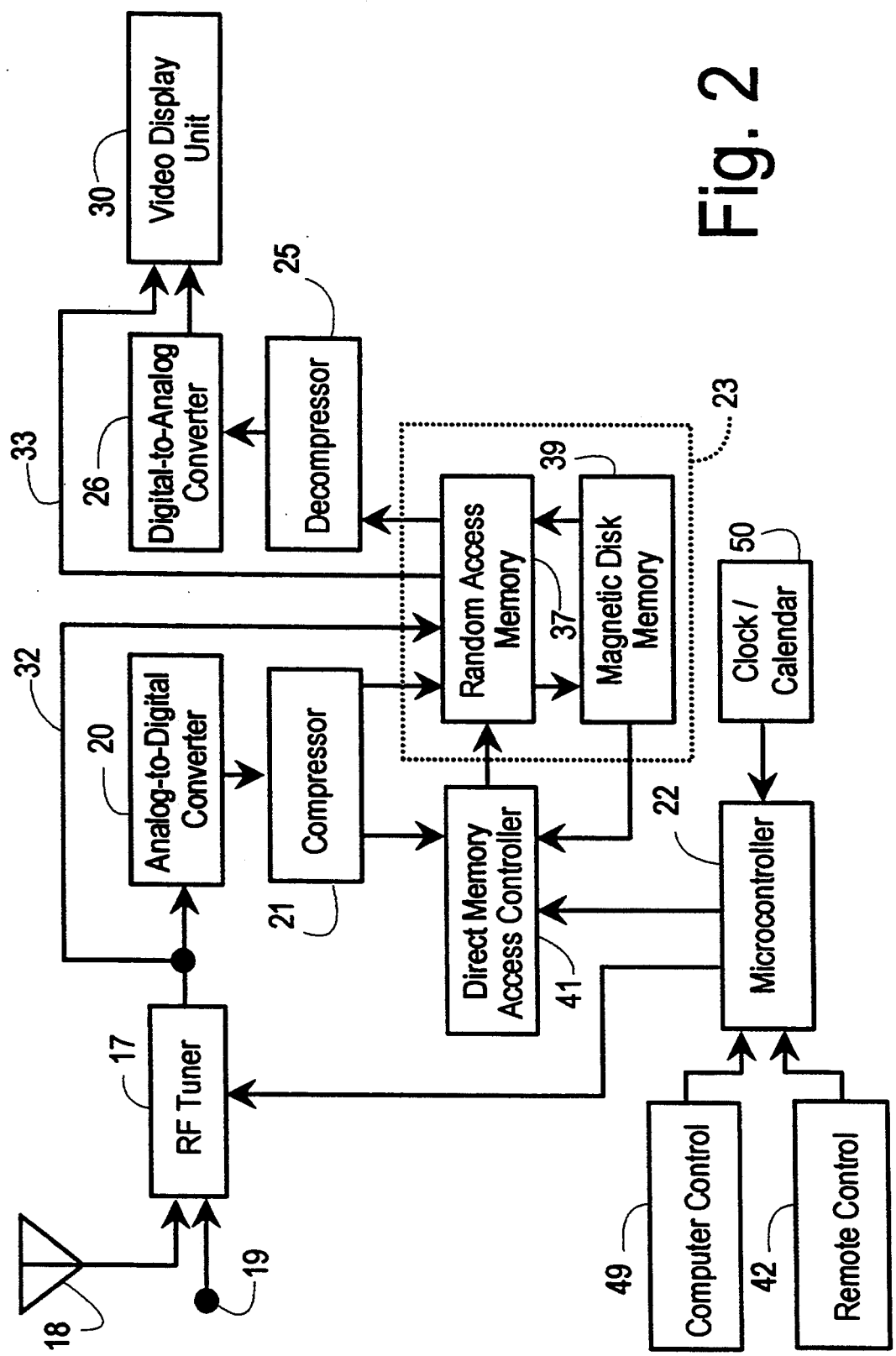
FIG. 2 is a more detailed hardware block diagram of the video buffer system embodying the invention.

As seen in FIG. 2, the invention also advantageously includes a clock/calendar unit 15 which is connected to the microprocessor 11 to automatically activate the system at scheduled times. In this way, the system need not be in continuous operation but may instead be activated in advance of scheduled use so that the memory subsystem 5 is fully loaded with prior programming at the time viewing begins.

In operation, the memory subsystem 5 stores one or more previously received signals which are supplied by the input unit 4 and selected at the switching node 3 under the control of microprocessor 11. The input unit 4 is composed of a one or more of simultaneously operating input signal processors each of which is connected to a source of programming signals. As seen in FIG. 1, one of more of these pathways may be connected to a source of compressed digital HDTV signals selected by an RF tuner as indicated at 4A. The input signal processors seen at 4B and 4C each comprise the cascaded combination of an RF tuner for selecting a desired frequency channel and a compressor for converting the selected signal into compressed digital format. Finally, the input signal processor seen at 4D receives a video baseband signal which is simply compressed and supplied to the switching node 3.

Using the remote control 13, or the connected computer 14, the user may select for viewing on the monitor 10 not only a particular incoming program but may select any point in time within the stored time window. Accordingly, in response to user commands, the display unit can provide an instant replay of selected programming, fast forward over undesired segments, pause and restart the programming, or provide fast, slow, or reverse motion displays, all of these functions being provided by altering the memory system address at which the programming to be displayed is read.

The hardware components of the system embodying the principles of the invention is further illustrated in FIG. 2 of the drawings. A single input signal processor shown consists of an RF tuner 17 connected to receive broadcast signals from an antenna 18 or a cable TV source 19. The RF tuner 17, under the control of a microcontroller 13, selects one or more available incoming video signals and transmits the selected analog video signals to an analog-to-digital converter 20. The analog-to-digital converter 20 converts the signal from analog to digital form and transmits the resulting frames of the video broadcast to a compressor 21. The compressor 21 compresses the frames in accordance with a compression ratio selected by the microcontroller 22 and transmits the compressed frames to a memory system indicated at 23 where the frames are stored at an addressable location established by the microcontroller 22. The microcontroller 22 also selects a location in the memory system 23 from which programming is to be read, and the retrieved signal is supplied to a decompressor 25 which translates the compressed information back into digitally expressed analog sample amplitude values which are supplied to a digital-to-analog converter 26. The converter 26 restores the retrieved video signal to its original analog form as received and the analog video signal is applied to a video display 30.

As noted earlier, when digital, compressed high definition television (HDTV) signals are selected by one of the tuners 17, the already compressed signals may be supplied to the write input of the memory subsystem 23 by a direct connection as indicated at 32. When such HDTV programming is selected for display, the stored digital compressed signals may passed directly to the HDTV display by a connection 33. The direct connections 32 and 33 by-pass the analog-to-digital conversion, compression, decompression and digital-to-analog conversion units since HDTV signals are broadcast in digital compressed form suitable for direct recording in the memory system 23, and are decompressed and converted into analog form for display within the standard HDTV receiving apparatus. The arrangement shown in FIG. 2 advantageously uses the same memory system to store either form of transmission.

The compressor 18 and decompressor 25 are preferably implemented by one of the available video encoder/decoder (codec) chip sets, such as Integrated Technology's (ITI) video processor, which supports both the H.261 video communications standard and multimedia standards MPEG and JPEG. Other video codec chip sets include the AT&T three-chip AVP-1000, GEC Plessey Semiconductors' VP2611 and a multi-standard chip set from Intel.

The memory system 23 is preferably comprised of primary high speed random access semiconductor memory 37 and a slower, secondary memory implemented by a high capacity magnetic disk device 39. Transfers to and from the random access memory are supervised by a direct memory access controller 41 which responds to memory access requests received from the microcontroller 22, the compressor 18, and the disk controller associated with disk memory 39.

The microcontroller 22 operates under program control to perform commands generated by a remote control 42 or alternatively by a personal computer 49 whose serial port may be connected to the serial port of the microcontroller 22. The microcontroller 22 comprises one or more integrated circuits to provide a processor, a read-only memory (ROM) which stores the programs executed by the processor, peripheral data handling circuits, and a random access read/write scratchpad memory for storing dynamically changing data. Such microcontrollers are available from a variety of sources and include the Intel386 family of devices which are described in detail in the *Microprocessor and Peripheral Handbook*, Volume 1 (1989), published by Intel Corporation, Literature Sales, Santa Clara, Calif.

The microcontroller 22 maintains a "circular buffer" in the memory system 23 in which the incoming video signal is continuously written to a continuously advancing memory location, writing over the oldest recorded data in the memory system as it advances the writing location. The read location, however, is completely under the control of the viewer who sends commands from the remote control unit 42 to the microcontroller 23 to perform the following functions:

PAUSE. The microcontroller 22 maintains the read point at its current location and repeatedly sends a single frame (video screen) of data to the display for stop-action viewing;

REPLAY. The microprocessor assembles single frame compressed data from equally spaced addresses in the random access memory 37 to form mosaic display frame, each frame consisting of set of reduced-size images which may be viewed simultaneously to reveal the contents of the buffer memory at spaced intervals. This mosaic presentation is periodically refreshed until the user selects a specific read point by number using the remote control 42 or personal computer 49, whereupon the microcontroller 22 sets the readpoint to the appropriate memory location and playback continues from that location. Note that this single control enables the user to not only replay past scenes, but to "fast forward" over unwanted programming (assuming the current read point is delayed from the write point by a duration at least equal to the programming to be bypassed.

CHANNEL SELECTION. The user may select a channel in the usual way (using numerical channel selection buttons), or may select the channel to be viewed (and recorded in the buffer) by commanding the tuner 10 to supply a sequence of frames from the available channel signals which are assembled, in compressed form, in the random access memory 37, from which they may be supplied via the decompressor 25 for display on the display unit 30. This picture-in-picture or "PIP" feature, commonly available only at added expense on conventional television receivers, is accordingly made available at little additional cost or complexity since the necessary instrumentalities are already available.

RESOLUTION. In addition to varying the read and write points the microcontroller 22 may also vary the compression ratio of the compressor 18 to increase the effective capacity of the buffer memory by reducing the resolution, color quality image size of the stored images, to vary the effective programming buffer capacity.

SLOW/FAST MOTION. Upon command from the control unit 42 or the computer 49, the microcontroller 22 may advance the read point at an increased or decreased rate commensurate with playback speed selected by the user.

REVERSE. In the reverse mode the direction of the read point is reversed so that flames already transmitted to the display are retransmitted in a reverse order. The length of time the reverse mode may be invoked is limited by the number of flames separating the read point and the write point.

It is to be understood that the specific arrangement which has been described is merely illustrative of one application of the principles of the invention. Numerous modifications may be made by those skilled in the art without departing from the true spirit and scope of the invention.

What is claimed is:

1. In combination,
   means for generating a substantially continuous sequence of a digital television input signal values,
   a source of control commands,
   a television signal utilization device, and
   a variable delay circular storage buffer having an input port connected to receive said digital television input signal values and an output port connected to supply a delayed replica of said input signal values to said utilization device following a variable delay interval, the duration of said interval being selectable in response to said control commands, said circular storage buffer comprising, in combination:
   an addressable digital memory,
   a programmed processor,
   memory access means for continuously writing said sequence of digital television input signal values into said addressable digital memory, at a sequence of writing addresses established by said processor and for concurrently reproducing and supplying to said output port an output sequence of previously written ones of signal values read from said addressable digital memory at a sequence of different reading addresses established by said processor, and
   means for supplying said output sequence to said output port,
   wherein said programmed processor includes means responsive to said control commands for varying the relative locations of said reading and writing addresses to selectively alter said variable delay interval.

2. The combination set forth in claim 1 wherein said means for generating said input signal values comprises, in combination,
   means for receiving an analog television program signal,
   an analog-to-digital converter for translating said program signal into
   a first sequence of digital values, and
   data compression means for translating said first sequence of digital
   values into more compact form for storage in said addressable memory, wherein said combination further comprises data decompression means connected between said output port and said utilization device.

3. The combination as set forth in claim 2 wherein said compression means is responsive to said processor means for varying the compression ratio at which said first sequence of digital values is translated into more compact form.

4. The combination as defined in claim 1 wherein one of said control commands is a pause command and wherein said programmed processor further includes means responsive to said pause command for maintaining said reading addresses to repeatedly send a portion of the television signal stored in said memory to said output port.

5. The combination as defined in claim 4 wherein one of said control commands is a playback speed command and wherein said programmed processor further includes means responsive to said playback speed command for altering the rate at which said reading addresses are changed.

6. The combination as defined in claim 4 wherein one of said control commands is a reverse command and wherein said programmed processor further includes means responsive to said playback speed command for altering said reading addresses in a reverse order from the sequence of writing addresses used to store said television input signal to thereby provide a reverse motion television signal to said output port.

7. The combination as defined in claim 1 wherein one of said control commands include a replay selection command and wherein said programmed processor further includes means for selectively accessing data at a plurality of different frame addresses stored in said digital memory to form data representing a mosaic of reduced size images, each of said images representing data at a corresponding one of said frame addresses, and wherein said programmed processor further includes means responsive to said replay selection command for setting said reading address to a selected one of said frame addresses identified by said replay selection command.

8. The combination as set forth in claim 7 wherein said compression means includes means responsive to said processor means for varying the compression ratio at which said first sequence of digital values is translated into more compact form.

* * * * *